3,729,312
ELECTROPHOTOGRAPHIC COMPOSITION EMPLOYING POLY(VINYL-HALOBENZAL) BINDER FOR ORGANIC PHOTOCONDUCTORS

Raymond H. Young, Jr., Macon, Ga., assignor to Monsanto Company, St. Louis, Mo.
No Drawing. Filed June 22, 1971, Ser. No. 155,654
Int. Cl. G03g 5/04
U.S. Cl. 96—1.5
9 Claims

ABSTRACT OF THE DISCLOSURE

Disclosed herein are poly(vinyl-halobenzal) binders for photoconductor compositions used in reprographic applications.

BACKGROUND OF THE INVENTION

(1) Field of the invention

This invention relates to binders for photoconductive compositions which are used in reprographic applications. More particularly, this invention relates to poly(vinyl-halobenzal) binders for photoconductors which are used in electrophotographic applications.

(2) Description of the prior art

Electrophotography relates to substrates having a photoconductive substance coated thereon which provides a surface upon which images are reproducible. The substrate may, for example, be paper, glass, metal foil, transparent films such as polyester film, cellulose acetate, nitrate, etc. The photoconductive substance is a material having electrical conductivity dependent upon the amount of light to which it is subjected. Images to be reproduced are projected onto the charged, light sensitive surface which is exposed to illumination by conventional photographic methods whereby the coating locally dissipates its charge in proportion to the intensity of illumination. Non-illuminated areas which retain their charge, are then treated with electroscopic powder (e.g., colored synthetic resins) resulting in a visible image which may be transferred to another surface or may be fixed, e.g., by fusing, rendering the powder permanently adherent to the coating substrate. The rate at which the illuminated charged surface dissipates its charge is highly important to a commercially successful reproductive coating system. Higher dissipation rates usually result in faster reproduction processes. Conversely, systems with higher dissipation rates usually require less light in the reproduction process. Both of these factors directly affect commercial acceptance of the system.

Fundamentally, electrophotographic systems comprise a photoconductor, a binder, which is usually an organic polymeric resin, for adhering the photoconductor to the substrate to be coated and a dye sensitizer. While much success has been realized in the electrophotographic art, a definite need still exists for new and improved binders which will provide faster reproduction times in electrophotographic systems. Moreover, a need exists in the art for binders with improved stability, hardness, toughness and scratch resistance.

SUMMARY OF THE INVENTION

The present invention fulfills the above-mentioned need that exists in the art by providing poly(vinyl-halobenzal) binders which allow fast reproduction processes in electrophotographic systems. Moreover, these binders exhibit improved stability, hardness, toughness and scratch resistance which make them especially suitable for use in transparencies and other related applications where hardness in the binder is a desirable feature.

DESCRIPTION OF THE PREFERRED EMBODIMENTS

The poly(vinyl-halobenzal) binders are prepared by heating polyvinyl alcohol and the appropriate halobenzaldehyde in a suitable solvent in the presence of an acidic catalyst. The resulting acetalization product is then neutralized, isolated, washed and dried, using standard procedures which are described in greater detail below.

The polyvinyl alcohol used to prepare the poly(vinyl-halobenzal) is partially or fully hydrolyzed material wherein the residual ester content, calculated as polyvinyl acetate is in the range of from 0 to 40% by weight and more preferably from 0 to 20% by weight. Polyvinyl alcohols having a viscosity of from 1 to 110 cps., when measured as a 4% aqueous solution viscosity at 20° C. are especially suited for the preparation of the binders of the present invention.

The binders of the present invention have a hydroxyl content (measured as polyvinyl alcohol) of from 6 to 20% by weight; a residual vinyl ester content (calculated as polyvinyl acetate) of from 0 to 40% by weight; and a polyvinyl halobenzal content in the range of from 40 to 94% by weight. Preferably the binders of the present invention have a hydroxyl content of from 8 to 12% by weight; a residual acetate content of from 0 to 20% by weight; and a halobenzal content in the range of from 68 to 92% by weight.

The preferred halogens for use in the present invention are chlorine and bromine with chlorine especially preferred.

The amount of halogenation on the benzaldehyde starting material may vary from mono to penta substitution with the mono and disubstituted halogen derivatives being preferred.

Examples of the preferred binders would include:

poly(vinyl-2-chlorobenzal),
poly(vinyl-3-chlorobenzal),
poly(vinly-4-chlorobenzal),
poly(vinyl-3,4-dichlorobenzal),
poly(vinyl-2,5-dichlorobenzal),
poly(vinyl-3,6-dibromobenzal),
poly(vinyl-2,6-dichlorobenzal),
poly(vinyl-3,5-dichlorobenzal),
poly(vinyl-2,3-dichlorobenzal),
poly(vinyl-2,4-dichlorobenzal),
poly(vinyl-2-bromobenzal),
poly(vinyl-3-bromobenzal),
poly(vinyl-4-bromobenzal),
poly(vinyl-3,4-dibromobenzal),
poly(vinyl-2,5-dibromobenzal),
poly(vinyl-2,6-dibromobenzal),
poly(vinyl-3,5-dibromobenzal),
poly(vinyl-2,3-dibromobenzal),
poly(vinyl-2,4-dibromobenzal).

Especially preferred are poly(vinyl-2-chlorobenzal) and poly(vinyl-2,4-dichlorobenzal).

The poly(vinyl-halobenzal) binders of the present invention are used in combination with the well known photoconductors and dyes used in electrophotographic reproducing processes.

Examples of the photoconductors used in the art include zinc oxide, titanium dioxide, etc., and organic photoconductors such as:

4,5-diphenyl-1,2-imidazolone;
4,5-diphenylimidazole-2-thione and their derivatives;
1-phenyl-3,5-bis(p-methoxy-styryl)pyrazoline;
polymers of N-vinyl carbazole;
4,4"-dibromoterphenyl; poly(9-vinyl-anthracene);
N,N,N',N'-tetrabenzyl-p-phenylenediamine;

N,N,N',N'-tetra-o-chlorobenzyl-p-phenylenediamine;
N,N,N',N'-tetra-(2,5-dimethylbenzyl)-p-phenylenediamine;
N,N,N',N'-tetra-4-methylbenzyl-p-phenylenediamine;
N,N,N',N'-tetrabenzyloxydianiline;
N,N'-diisopropyl-N,N'-di(4-chlorobenzyl)-p-phenylenediamine;
4-diethylamino-2-methyl-benzylideneazine;
4-diallylamino-benzylideneazine;
4-diethylamino-benzylideneazine;
N,N-di(2,5-dimethylbenzyl)p-anisidine;
4-thiomethyl-N,N-dibenzylaniline;
4-(4'-diethylaminobenzylidene)-2-phenyl-5(4)oxazoline;
etc.

These and other organic photoconductive compounds are described in detail in U.S. Pats. 3,265,496; 3,447,922; 3,526,501 and 3,527,602, among others, and are incorporated herein by reference.

The dye sensitizers used in the electrophotographic reproducing processes are well known in the art and need no further description here. Examples of some of the dyes used are listed in U.S. Pat. 3,245,786 which is incorporated herein by reference.

Electrophotographic coating compositions using the poly(vinyl-halobenzal) binders of the present invention are prepared by dissolving the binder, the photoconductor and any additional ingredients such as a dye in an appropriate solvent. Examples of such solvents would include halogenated hydrocarbons such as methylene chloride, methylene bromide, chloroform, bromoform, carbon tetrachloride, carbon tetrabromide, ethylene dichloride, ethylene dibromide, ethylidene chloride, ethylidene bromide, s-tetrachloroethane, hexachloroethane, s-dichloroethylene, 1,1,1-trichloroethane, 1,1,2-trichloroethane, trichloroethylene, trimethylene bromide, trichlorobromoethane, trichloromethane, 1,2,3-trichloropropane, 1,1,2-trichloropropane, trifluoro-1,2-tribromoethane, trifluoro-1,1, 2 - trichloroethane, 2,2 - dichloro-1-bromoethane, 1,3-dichloro - 2 - methyl - propane, 1,2-dichloro-2-methyl-propane, 1,1-diiodoethane and the like.

Other solvents include N-methyl pyrrolidone, dialkyl formamides, dialkylacetamides and solvent blends of an aromatic hydrocarbon such as benzene, toluene, xylene, etc., with aliphatic ketones, alcohols and esters. Specific examples of these solvent blends include toluene-methanol; toluene-ethanol; toluene-methylethyl ketone, toluene-ethyl acetate, toluene-ethanol-ethyl acetate; benzene-ethanol - Cellosolve acetate; xylene-ethanol; toluene-acetone, etc.

The ratio of binder to photoconductor in the electrophotographic coating compositions of the present invention will vary from (a) 1 part of binder to 10 parts of photoconductor to (b) 10 parts of binder to 1 part of photoconductor. The amount of dye used will vary from 0 to 50,000 parts per million of photoconductor. The resin solids in the coating compositions will vary from 1 to 60% by weight based on the total weight of resin and solvent with from 3 to 50% by weight being preferred.

The coating compositions of the present invention are applied at coating weights of from 1 to 20 lbs. per 3000 sq. ft. of substrate and more preferably at a coating weight of from 2 to 10 lbs. per 3000 sq. ft. of substrate. As is discussed in greater detail below, free films of the poly(vinyl-halobenzal) binders of the present invention may be used as the substrate. In this case they serve as a matrix for the organophotoconductor, dye and any other ingredients. In these situations, the expression "coating weight" does ont really apply and the system is best described in the terms of film thickness of the poly(vinyl-halobenzal) based composition, which will be in the range of from 1 to 50 mils and more preferably from 1 to 20 mils.

The following examples are set forth in illustration of this invention and should not be construed as a limitation thereof. Unless otherwise indicated all parts and percentages given are by weight.

Examples 1 to 13

In these examples a poly(vinyl-2-chlorobenzal) resin having a polyvinyl alcohol content of 9.8% by weight and a residual acetate content in the range of from 0 to 2% by weight is used to illustrate the improved binders of the present invention.

The poly(vinyl-2-chlorobenzal) resin is prepared using the following charge:

| Charge: | Lbs. |
|---|---|
| Polyvinyl alcohol [1] | 29.30 |
| Ethanol | 108.2 |
| N-methyl pyrrolidone (NMP) | 108.2 |
| 2-chlorobenzaldehyde [2] | 51.2 |
| Sulfuric acid | 3.16 |

[1] The polyvinyl alcohol has a residual acetate content in the range of from 0 to 5% by weight and a viscosity in the range of from 4 to 6 cps. as measured as a 4% aqueous solution at 20° C.
[2] Commercially available from Tenneco.

The ingredients are slurried together and then the temperature is raised to between 85 and 95° C. while maintaining agitation. As the reaction proceeds the resulting poly(vinyl-2-chlorobenzal) resin goes into solution. After six (6) hours the reaction mixture is neutralized with the following charge.

| Neutralizing charge: | Lbs. |
|---|---|
| Potassium acetate | 7.6 |
| Water | 5.26 |
| N-methyl pyrrolidone | 5.26 |

The resin solution is then disintegrated with water. The resulting resin grain is washed repeatedly with ethanol and water and dried at 45° C. for 96 hours.

Electrophotographic coating compositions are prepared by dissolving 1.5 grams of resin binder and 1.0 gram of a photoconductor in 13.5 grams of chloroform. One milliliter (1 ml.) of a dye solution containing one gram (1 g.) of crystal violet in a liter of chloroform is then added to the resin binder-photoconductor solution.

The coating compositions are then applied to a commercially available conductive base paper by means of a wire wound rod so as to obtain about 4 dry lbs. of coating per 3000 sq. ft. After coating, the sheets are dried at 80–100° C. for about one (1) minute to completely remove the solvent. The coated stock is then conditioned overnight in the dark at 70° F. and 50% relative humidity.

The photosensitivity of the coated stock is determined in a step wedge test by placing a sheet of coated material, coated side up, on a Optographics Charging Easel (Optographics Corporation) charging the surface negatively in the dark, using corona discharge; placing a calibrated 21 step sensitivity guide on the charged coated surface and subjecting the assembly to 50 foot candles of light from a G.E. 212 enlarging bulb for 20 seconds. At the end of this period the sensitivity guide is removed and the image area treated with a positively charged toner powder to develop the remaining image. The photosensitivity of the coating is defined as the highest step which produces a density equivalent to the background density. The amount of exposure required to achieve this photosensitivity is then reported in terms of foot-candle-seconds (f.c.s.).

The results of these tests are tabulated in the following Table 1. Also included in Table 1 are the results of samples wherein polyvinyl butyral resin is used as the binder. The polyvinyl butyral resin is characterized as having a polyvinyl alcohol content in the range of from 9 to 13% and a residual acetate content in the range of from 0 to 2.5%. Polyvinyl butyral resin has found widespread use as binder for photoconductive compound and the examples using polyvinyl butyral as a binder are included as control examples to illustrate the suitability of the poly(vinyl-halobenzal) resins of the present invention as binders for photoconductive compounds.

TABLE 1.—SUMMARY OF STEP WEDGE TESTS FOR EXAMPLES 1 TO 13 IN E.C.S.

| Example | Photoconductor | Poly(vinyl-2-chlorobenzal) binder | Polyvinyl butyral control |
|---|---|---|---|
| 1 | N,N,N',N'-tetrabenzyl-m-phenylene diamine | 49 | 309 |
| 2 | N,N,N',N'-tetra-chlorobenzyl-p-phenylene diamine | 123 | >1,000 |
| 3 | N,N'-diisopropyl-N,N'-di-p-chloro-benzyl-p-phenylene diamine | 63 | 224 |
| 4 | N,N,N',N'-tetra(2,5-dimethyl benzyl-p-phenylene diamine | 162 | 123 |
| 5 | N,N,N',N'-tetrabenzyl-p-phenylene diamine | 89 | 123 |
| 6 | N,N,N',N'-tetra-p-methylbenzyl-p-phenylene diamine | 89 | 123 |
| 7 | N,N,N',N'-tetrabenzyl oxydianiline | 89 | 224 |
| 8 | 4-diallylaminobenzilidene azine | 12 | 123 |
| 9 | 4-diethylaminobenzilidene azine | 224 | 604 |
| 10 | 4-diethylamino-2-methylbenzilidene azine | 17 | 49 |
| 11 | 4-thiomethyl-N,N-dibenzyl aniline | 123 | --- |
| 12 | 4-(4'-diethylamino-benzilidene-2-phenyl-5(4) oxazolone | 64 | 123 |
| 13 | N,N-di(2,5-dimethylbenzyl)-p-anisidine | 123 | 427 |

The data in Table 1 illustrates that under comparable test conditions the electrophotographic systems which use poly(vinyl-2-chlorobenzal) as the binder component require considerably less energy to form an image than do the controls which use polyvinyl butyral as the binder component. This allows for faster electrophotographic processes under similar light conditions. Conversely, the electrophotographic systems using poly(vinyl-2-chlorobenzal) as the binder component require less light energy in the electrophotographic processes than those systems using polyvinyl butyral as the binder.

Another aspect of the improved electrophotographic coatings which are prepared using a binder of the present invention is shown in the results of the standard Victoreen Test. Examples 1 to 13 above are subjected to a standard Victoreen Test and the results reported in Tables 2A and 2B.

TABLE 2A.—VICTOREEN TEST RESULTS USING POLY(VINYL 2-CHLOROBENZAL) BINDER

| Example | Saturation voltage | Dark decay rate | Time to 50 volts | Time to ½ voltage |
|---|---|---|---|---|
| 1 | 780 | 7 | 2.64 | 0.34 |
| 2 | 210 | 6.0 | 2.2 | 1.28 |
| 3 | 110 | 5.0 | 1.2 | --- |
| 4 | 255 | 12.5 | >7.0 | 7.0 |
| 5 | 155 | 3.0 | 1.16 | --- |
| 6 | 105 | 4.0 | 1.16 | --- |
| 7 | 460 | 11.5 | 4.3 | 1.0 |
| 8 | 675 | 5.5 | 1.2 | 0.26 |
| 9 | 675 | 5.5 | 6.0 | 1.72 |
| 10 | 630 | 3.5 | 0.86 | 0.24 |
| 11 | 595 | 5.5 | 4.1 | 0.51 |
| 12 | 555 | 7.0 | 2.6 | 0.37 |
| 13 | 680 | 4.0 | 4.5 | 0.52 |

TABLE 2B.—VICTOREEN TESTS USING POLYVINYL BUTYRAL BINDER

| Example | Saturation voltage | Dark decay rate | Time to 50 volts | Time to ½ voltage |
|---|---|---|---|---|
| 1 | 680 | 8.0 | 11.7 | 0.80 |
| 2 | 355 | 5.0 | >7.0 | >7.0 |
| 3 | 280 | 9.0 | >10 | 8.0 |
| 4 | 80 | --- | --- | --- |
| 5 | 160 | 4.0 | 3.7 | 3.0 |
| 6 | 75 | --- | --- | --- |
| 7 | 655 | 5.5 | 6.1 | 0.64 |
| 8 | 530 | 9.0 | 6.0 | 0.72 |
| 9 | 400 | 2.0 | 7.7 | 3.16 |
| 10 | 620 | 7.5 | 1.6 | 0.38 |
| 11 | 40 | --- | --- | --- |
| 12 | 570 | 7.0 | 3.8 | 0.50 |
| 13 | 600 | 8.0 | >10 | 1.04 |

The Victoreen instrument measures the charge capacity of a particular coating, the ability of that coating to hold a charge in the dark and the rate at which it loses or dissipates the charge under the influence of specified light levels. The Victoreen tests are run under the following conditions:

(a) Static test
(b) 3 inches/second travel
(c) Corona Current=35 micron amperes
(d) Light=2 foot candles (f.c.)

The data in the Tables 2A and 2B show that the time to dissipate charge to 50 volts for coatings using poly(vinyl-2-chlorobenzal) as the binder are consistently less than for those control compositions using polyvinyl butyral as the binder.

Still another facet of the present invention is illustrated by the Most-Stati Tester (M/K Systems, Inc., Lynn, Massachuetts) which illustrates the ability of the poly(vinylhalobenzal) based coating compositions to accept either positive or negative charges. In the Stati test, the paper is prepared as above using the poly(vinyl-2-chlorobenzal) based coatings used in Examples 1 to 13 which are then tested according to standard Stati Test procedures. The Stati Tester results indicate that the poly(vinyl-halobenzal) based coating compositions of the present invention work equally well using either positive or negative charges. This feature permits the coating compositions to be used in wider, more varied applications.

The following Examples 14 to 19 illustrate various electrophotoconductive coating compositions using poly(vinyl halobenzal) resins of the present invention as binders. These resins are formulated into coatings using the photoconductor used in Example 1 above, coated onto paper and tested as above. Results of these tests are tabulated in the following Table 3.

TABLE 3.—SUMMARY OF EXAMPLES 14 TO 19

| Ex. | Binder | Dye | Victoreen test Saturated voltage | Victoreen test Decay rate [1] | Victoreen test Time [2] | Step wedge test, f.c.s. |
|---|---|---|---|---|---|---|
| 14 | Polyvinyl butyral (control) | Violet | 555 | 5.5 | 9.0 | 427 |
| 15 | do | Cyanine | 475 | 2.5 | 30.0 | 912 |
| 16 | Poly(vinyl-2-chlorobenzal) | do | 345 | 6.5 | 7.0 | 162 |
| 17 | Poly(vinyl-4-chlorobenzal) | Violet | 280 | 2.0 | 36.0 | 604 |
| 18 | Poly(vinyl-2,4-dichlorobenzal) | do | 400 | 2.0 | 2.2 | 309 |
| 19 | Poly(vinyl-3,4-dichlorobenzal) | Cyanine | 295 | 11.0 | 30.0 | 912 |

[1] Dark decay rate (initial voltage−voltage at end of 10 seconds in the dark, ÷10).
[2] Time to 50 volts, in seconds (measured from end of dark decay, under 20 f.c. light).

Examples 14 to 19 illustrate some of the many variations that are possible in electrophotoconductive coating compositions. The results of the Victoreen and step wedge tests further illustrate the variations in performance that may be achieved by varying one of the components of the coating compositions. Those skilled in the art are aware of these variations and select the components accordingly in order to tailor the coating composition in order to meet the requirement of a given application.

As stated above, certain applications require a degree of hardness in the binder which is lacking in some of the binders of the prior art. The hardness rating of a binder is conveniently measured on the binder in film form using any one of several methods for determining hardness. One such method is the pencil hardness test which is described by Gardner and Sward at pages 131 and 132 of Paint Testing Manual, Physical and Chemical Examination, Paints, Varnishes, Lacquers and Colors, 12th edition, March 1962, distributed by Gardner Laboratory, Inc., Bethesda, Maryland.

The pencil hardness test employs the following rating scale.

7B  6B  5B  4B  3B  2B  B  HB  H  2H  3H  4H  5H  6H  7H

On this scale 7B has a very soft rating while 7H has a very hard rating. Intermediate on the hardness scale is a HB rating.

Pencil hardness tests are run on some binders of the present invention and the results of this test are reported in the following Table 4.

TABLE 4.—SUMMARY OF PENCIL HARDNESS TEST

| Binder tested: | Hardness rating |
|---|---|
| Poly (vinyl butyral) (control) | B |
| Poly (vinyl-2-chlorobenzal) | 4H |
| Poly (vinyl-2,4-dichlorobenzal) | 4H |
| Poly (vinyl-4-chlorobenzal) | 3H |
| Poly (vinyl-3,4-dichlorobenzal) | 3H |

The results of the foregoing table indicate the superior hardness properties found in the poly(vinyl-halobenzal) binders of the present invention.

Electrophotographic conductive coatings based on the poly(vinyl-halobenzal binders of the present invention may be coated onto a variety of substrates in order to obtain reprographic articles. These substrates include paper, glass, metal foils and transparent films. Examples of the transparent films include polyester film such as polyethylene terephthalate, cellulose acetate, cellulose nitrate, cellulose butyrate, cellophane, etc.

The poly(vinyl-halobenzal) binders of the present invention have good film forming properties and dried films exhibit good toughness, hardness, clarity, etc. This enables these binders to be cast into films which may be used in place of the transparent films referred to above in the manufacture of reprographic transparencies. When used in this manner, they may be considered as being a substrate as well as the matrix binder in which the organic photoconductor, dye or any other additive is dispersed. This provides a decided advantage in the manufacture of reprographic films and transparencies.

From the foregoing it should be apparent that many variations may be made in the present invention without departing from the spirit and scope thereof.

What is claimed is:

1. In an electrophotographic composition comprising a photoconductor, a dye sensitizer and a resinous binder wherein the weight ratio of binder to photoconductor is in the range of 1:10 to 10:1 and wherein there are up to 50,000 parts by weight of dye sensitizer per million parts by weight of photoconductor, the improvement which comprises using a poly(vinyl-halobenzal) as the resinous binder.

2. The improved electrophotographic composition of claim 1 wherein the resinous binder is a poly(vinyl-chlorobenzal).

3. The improved electrophotographic composition of claim 2 wherein the resinous binder is poly(vinyl-2,4-dichlorobenzal).

4. The improved electrophotographic composition of claim 2 wherein the resinous binder is poly(vinyl-2,4-dichlorobenzal.

5. The improved electrophotographic composition of claim 2 wherein the resinous binder is poly(vinyl-3,4-dichlorobenzal).

6. In an electrophotographic composition comprising a photoconductor, a dye sensitizer and a resinous binder wherein the weight ratio of binder to photoconductor is in the range of 1:10 to 10:1 and wherein there are up to 50,000 parts by weight of dye sensitizer per million parts by weight of photoconductor, the improvement which comprises using as the resinous binder, a poly (vinyl-chlorobenzal) having a hydroxyl content of from 6 to 20% by weight, and a residual vinyl ester content of from 0 to 40% by weight.

7. The improved electrophotographic composition of claim 6 wherein the resinous binder is a poly(vinyl-2-chlorobenzal).

8. The improved electrophotographic composition of claim 6 wherein the resinous binder is poly(vinyl-2,4-dichlorobenzal).

9. The improved electrophotographic composition of claim 6 wherein the resinous binder is poly(vinyl-3,4-dichlorobenzal).

References Cited

UNITED STATES PATENTS

| 3,437,481 | 4/1969 | Graver et al. | 96—1.8 |
| 3,554,746 | 1/1971 | Merrill | 96—1.5 X |

OTHER REFERENCES

Chemical Abstracts: vol. 67, 1967, 22,335y; vol. 68, 1968, 50,424r; vol. 68, 1968, 79,443g.

GEORGE F. LESMES, Primary Examiner

J. R. MILLER, Assistant Examiner

U.S. Cl. X.R.

96—1.8; 260—73